Figure 1:
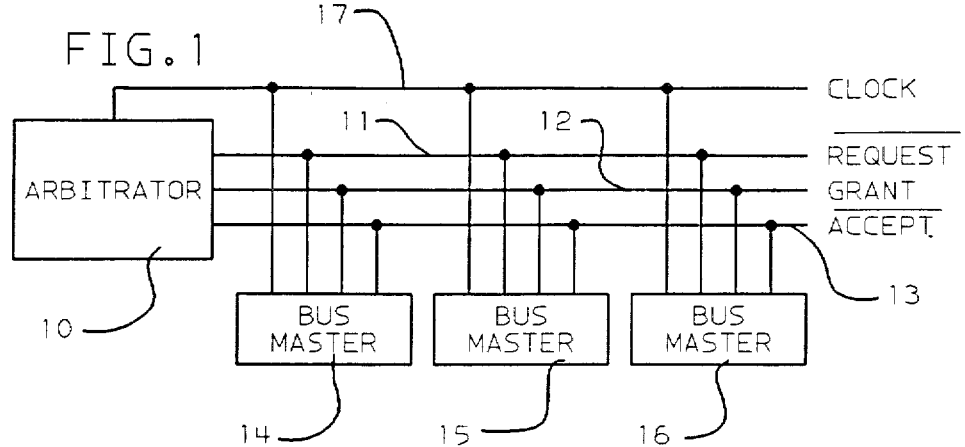

United States Patent [19]

Clarke

[11] Patent Number: 4,789,926
[45] Date of Patent: Dec. 6, 1988

[54] DIGITAL DATA PROCESSING ARBITRATION SYSTEM

[75] Inventor: David A. Clarke, Eastleigh, England

[73] Assignee: International Business Machines Corporation, Armonk, N.Y.

[21] Appl. No.: 888,291

[22] Filed: Jul. 21, 1986

[30] Foreign Application Priority Data

Aug. 6, 1985 [EP] European Pat. Off. ........ 85305594.5

[51] Int. Cl.⁴ .............................................. G06F 13/14
[52] U.S. Cl. .................................................... 364/200
[58] Field of Search ..................................... 340/825.5; 364/200 MS File, 900 MS File

[56] References Cited

U.S. PATENT DOCUMENTS

| | | | |
|---|---|---|---|
| 4,199,661 | 4/1980 | White et al. ........................ | 370/91 |
| 4,320,467 | 3/1982 | Glass .................................. | 364/900 |
| 4,359,731 | 11/1982 | Beauford et al. ............... | 340/821.51 |
| 4,499,538 | 2/1985 | Fingers et al. ................... | 364/200 |
| 4,541,043 | 9/1985 | Ballegeer et al. ................. | 364/200 |
| 4,641,266 | 2/1987 | Walsh ................................ | 364/200 |

FOREIGN PATENT DOCUMENTS 0030978 6/1980 European Pat. Off. .

OTHER PUBLICATIONS

Patent Abstracts of Japan, vol. 6, No. 88, (p. 118) [966] May 26, 1982, JP-A-5725027 (Hitachi Seisa Kusho K.K) 09-02-1982.

Primary Examiner—Gareth D. Shaw
Assistant Examiner—Debra A. Chun
Attorney, Agent, or Firm—Frederick D. Poag; Robert L. Troike

[57] ABSTRACT

In a digital data processing system having a resource which is shared between a plurality of users, an arbitration system comprises a plurality of resource requestors (14 to 16) each associated with a respective user, and a resource grantor (10) to which the requestors are connected in parallel via a set of common lines (11 to 13). Each resource requestor is adapted to apply a request signal on a predetermined first one (11) of the lines when the associated user requests the resource, and the resource grantor is responsive to the presence of a request signal on the first line to subsequently apply a grant signal on a predetermined second one (12) of the lines to grant the resource. Each resource requestor requesting the resource is responsive to the grant signal to apply an accept signal on a predetermined third one (13) of the lines after a delay which is different for each resource requestor and which determines the priority of the user associated with the resource requestor. The first accept signal so applied gives the resource to the associated user and prevents any other resource requestor from applying an accept signal on the third line until the resource is relinquished by the current user.

3 Claims, 2 Drawing Sheets

DIGITAL DATA PROCESSING ARBITRATION SYSTEM

This invention relates to an arbitration system in a digital data processing system.

Digital data processing systems frequently require a resource, e.g. a data bus, to be shared by several users, e.g. processors. An arbitration mechanism is needed to decide which user has control of the resource.

Existing mechanisms are generally one of two types. In the first type, resource requestors (i.e. devices which request the resource on behalf of an associated user), are chained together and a request signal from any one is passed through all the intervening devices to a common arbitrator. This has the merit of needing only a small number of connecting wires, but means that if a device is removed a "dummy" must be substituted in its place to maintain the chain.

In the second type of arbitration mechanism, all devices are connected individually to the arbitrator. In this case the removal of a device from the system is simple, but a large number of connecting wires are required.

It is therefore an object of the invention to provide an improved arbitration mechanism which requires only a small number of wires and in which devices can be removed and replaced at random without rewiring or the substitution of "dummy" devices.

Accordingly, the present invention provides, in a digital data processing system having a resource which is shared between a plurality of users, an arbitration system comprising a plurality of resource requestors each associated with a respective user, and a resource grantor to which the requestors are connected in parallel via a set of common lines, each resource requestor being adapted to apply a request signal on a predetermined first one of the lines when the associated user requests the resource, and the resource grantor being responsive to the presence of a request signal on the first line to subsequently apply a grant signal on a predetermined second one of the lines to grant the resource, each resource requestor requesting the resource being responsive to the grant signal to apply an accept signal on a predetermined third one of the lines after a delay which is different for each resource requestor and which determines the priority of the user associated with the resource requestor, the first accept signal so applied giving the resource to the associated user and preventing any other resource requestor from applying an accept signal on the third line until the resource is relinquished by the current user.

In the preferred embodiment of the invention the grant signal is removed from the second line when the existing user relinquishes the resource irrespective of the presence of a request signal on the first line, and is reapplied to the second line only in the event of a request signal from a further resource requestor being present on the first line, removal of the grant signal serving to reset all resource requestors such that none can apply an accept signal to the third line until after the full delay applicable to each. Further, the priority-determining delay in each resource requestor is preferably determined by a counter which is adapted to provide an output signal, from which the accept signal is derived, after counting a respective predetermined number of clock signals which are applied continuously and in common to all the resource requestors, each counter being initialised by removal of the grant signal from the second line and being enabled to count when the grant signal is reapplied.

Figure 2:
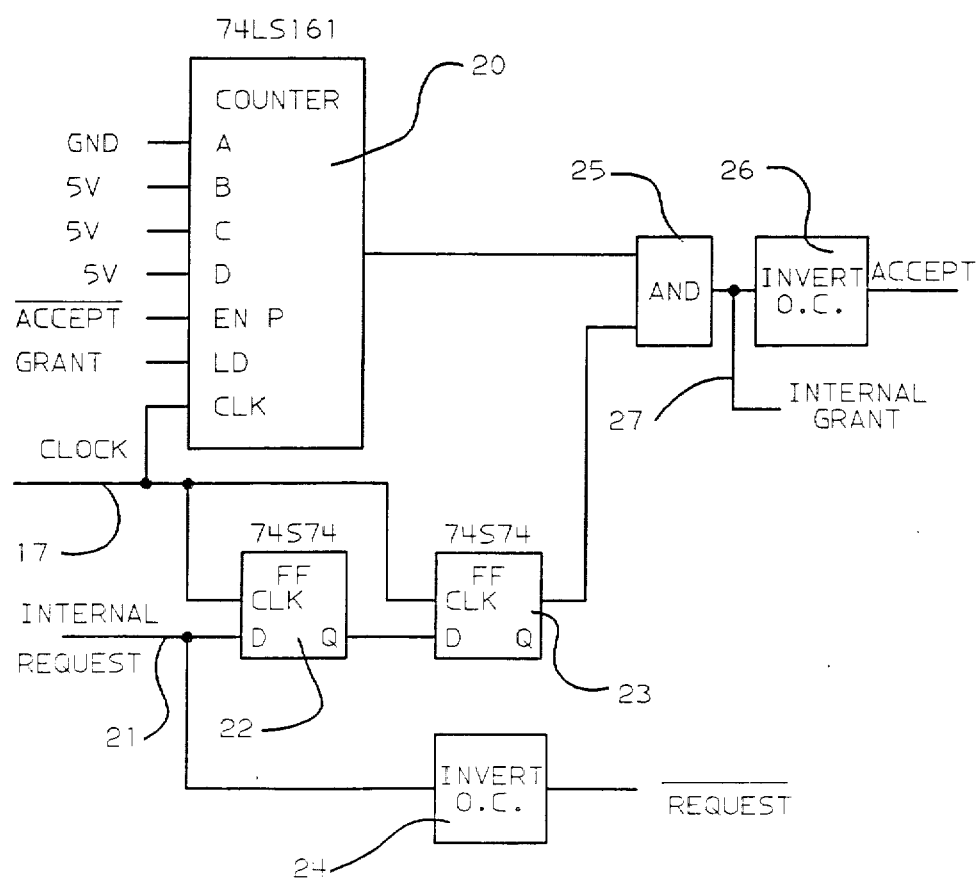
Figure 3:
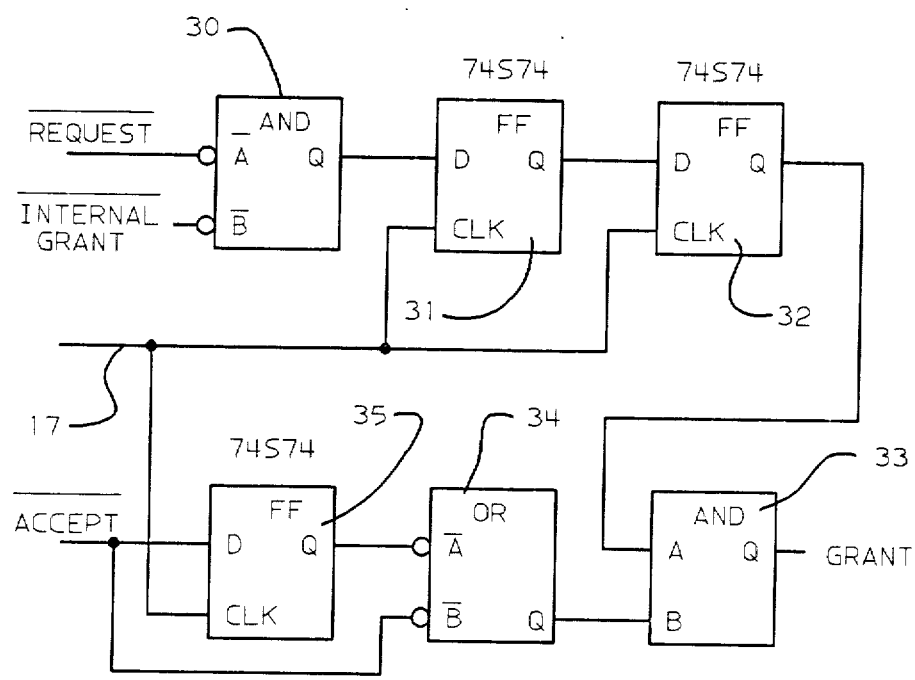
Figure 4:
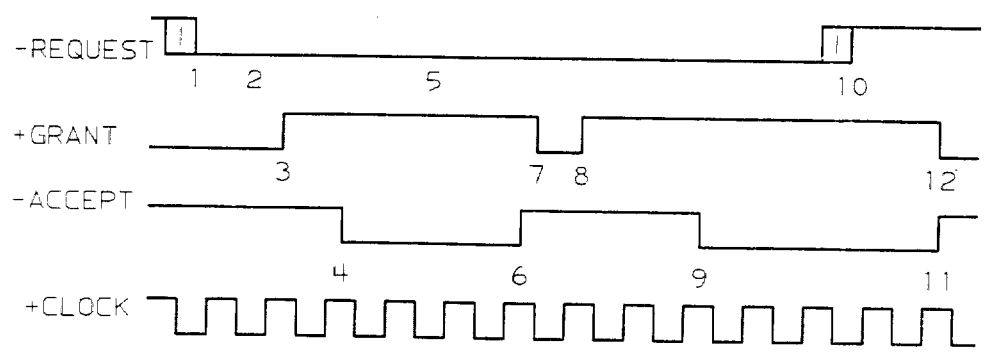
Figure 5:
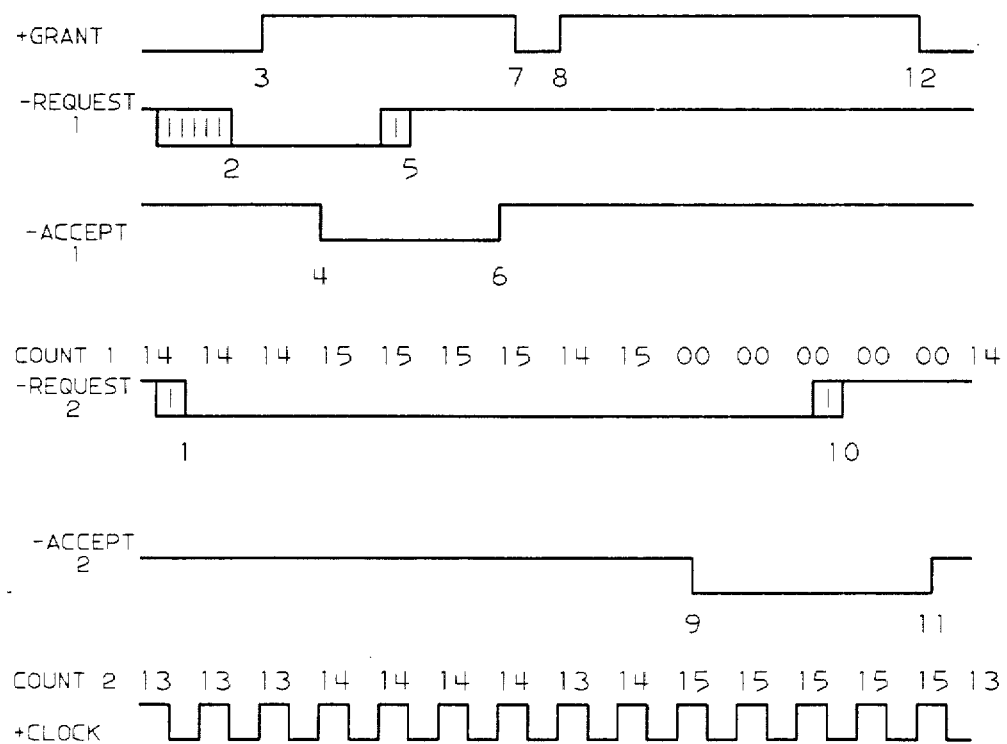

An embodiment of the invention will now be described, by way of example, with reference to the accompanying drawings, in which:

FIG. 1 is a a block schematic diagram of an arbitration system according to the embodiment of the invention, FIG. 2 is a block circuit diagram of one of the bus masters (resource requestors) of FIG. 1, FIG. 3 is a block circuit diagram of the resource grantor of FIG. 1, FIG. 4 is a timing diagram of a typical sequence of operations in the system of FIG. 1, and FIG. 5 is a timing diagram similar to FIG. 4 but showing the individual request and accept signals associated with respective bus masters which contribute to the overall signal pattern of FIG. 4.

In the following embodiment the invention is described in the context of a digital data processing system in which a number of processors are required to share a common bus. Accordingly, the resource requestors are termed "bus masters". However, the invention has general applicability where a resource (e.g. an input/output device) must be shared between a number of users. Furthermore, apart from the arbitration system itself, details of the associated data processing system (i.e. bus and processors) are not shown as they are not necessary for an understanding of the invention and would unduly complicate the drawings.

In the figures and in the description it is to be understood that where a term in capitals, such as ACCEPT or REQUEST, is preceded by a minus sign, or has a bar over it, then this denotes a signal which is significant when it is low (logical 0), whereas when the term is preceded by a plus sign, or has no such bar, it is significant when it is high (logical 1).

Turning now to FIG. 1, the arbitration system comprises a resource grantor 10 (hereinafter referred to for convenience as an arbitrator) having three single lines 11 (−REQUEST), 12 (+GRANT) and 13 (−ACCEPT). These lines 11 to 13 are common to a plurality of bus masters 14, 15, 16 etc. which are connected in parallel to these lines in a manner to be described. Clock pulses are applied in common to the bus masters on a further line 17. Lines 11 and 13 are driven by the bus masters, whereas line 12 is driven by the arbitrator, and as will be described more fully later each bus master is assigned a different priority which is expressed as a delay between the activation of the +GRANT signal on line 12 by the arbitrator 10 and the activation of the −ACCEPT signal on the line 13 by the bus master.

A block diagram of a bus master is shown in FIG. 2. It should be understood that, apart from the priority which is set by the voltages applied to the A to D inputs of a counter 20 in the bus master, all bus masters operate in identical fashion and therefore the following description will apply to all bus masters. Where they appear, the combination of letters and numbers above each block in this and other figures refer to the type number of commercially obtainable components.

A bus master is triggered to request the resource (the bus) by a +INTERNAL REQUEST signal applied to the input 21. The +INTERNAL REQUEST signal is assumed to be supplied by the associated processor (not shown) which needs the bus. The +INTERNAL REQUEST signal is inverted by an open collector driver 24 to drive the −REQUEST line 11 to the arbitrator 10 low. The +INTERNAL REQUEST signal is also synchronised with the clock 17 using two flip flops 22 and 23 to prevent metastability. In a compleely synchronous system, for example where all the associated processors were driven by a common clock, the flip flops 22 and 23 would not be necessary.

The counter 20 is loaded with a number which determines the priority of the bus master. The value 14 is the highest priority followed by 13, 12, 11 etc. The bus master shown in FIG. 2 is assumed to be that having the highest priority, since the voltages shown at inputs A to D represent the number 14. Other bus masters would have a different combination of voltages applied at the inputs A to D. The priority-determining number for each bus master is loaded into the respective counter 20 each time a clock pulse is applied to the counter 20 and the +GRANT signal on line 12 is low. However, when the +GRANT signal on line 12 is set high by the arbitrator 10, which follows the −REQUEST line 11 being driven low by any bus master, the counter is enabled and counts up until it reaches the value 15, whereupon the counter output CO goes high. If the synchronised +INTERNAL REQUEST signal is low (i.e the bus master is not requesting the resource) then the counting wraps to zero and continues, the high output on CO being removed. On the other hand, if the synchronised +INTERNAL REQUEST signal is high, then the high output at CO passes through the AND gate 25 and drives the −ACCEPT line 13 to the arbitrator 10 low via an inverting open collector driver 26.

The −ACCEPT signal on the line 13 inhibits the counting of all bus master counters 20 in the system, and the processor associated with the particular bus master driving the −ACCEPT line 13 can now use the resource freely. This is signalled to the associated processor by a +INTERNAL GRANT signal provided on the line 27.

It will be observed that since the number set in each bus master counter 20 is held at its initial value while the +GRANT line 12 is low, and they all start counting only when the +GRANT line 12 goes high, only the bus master with the highest priority which is requesting the resource will obtain it, since all the other bus masters will be locked out as soon as the −ACCEPT line 13 is driven low by the successful bus master.

When the current processor has finished with the resource the associated +INTERNAL REQUEST signal 21 is set low. The −REQUEST line 11 is released and will go high if no other bus master is requesting the resource. Two clock cycles later, due to the delay through the flip flops 22 and 23, the −ACCEPT signal is released. As will be described in relation to FIG. 3, this causes the arbitrator 10 to set the +GRANT line 12 low for at least one clock cycle to reset all counters 20 to their initial states. Thus, even if it has an outstanding request, any other bus master must count up from its initial value before it can obtain the resource.

The arbitrator 10 is shown in block diagram form in FIG. 3. A low −REQUEST signal on the line 11 indicates that a bus master is requesting the resource, and this signal is applied to one input of an AND gate 30. In the present case it is assumed that the arbitrator is itself associated with a default processor which use the resource when it is free, so that a +GRANT signal to the line 12 cannot be given immediately in all cases. However, when the default processor relinquishes the resource a −INTERNAL GRANT signal applied to the other input of the AND gate 30 is set low. If the arbitrator does not use the resource the −INTERNAL GRANT signal is not required.

The output from the AND gate 30 is synchronised with the clock 17 using two flip flops 31 and 32 in series to prevent metastability. As before, systems which are fully synchronous do not require these flip flops.

The synchronised signal from the second flip flop 32 is applied to one input of an AND gate 33. The other input to the AND gate 33 is from an OR gate 34 whose two inputs are respectively connected directly to the −ACCEPT line 13 and indirectly thereto via a flip flop 35. At this stage the −ACCEPT signal on line 13 is high so that the AND gate 33 is enabled by the output of the OR gate 34. Accordingly, the signal from the flip flop 32 becomes the +GRANT signal on line 12.

The +GRANT signal enables the counters 20 in the bus masters 14 to 16 as previously described, and the first to reach the count of 15 sets the −ACCEPT line 13 low to inhibit other bus masters and permit the associated processor to use the resource. The changing of the signal on the −ACCEPT line 13 from high to low does not disable the AND gate 33 since it is enabled via the OR gate 34 from the output of the flip flop 35.

When the existing user of the resource finishes and lets the −ACCEPT signal on line 13 go high, the OR gate 34 and flip flop 35 force the +GRANT signal on line 12 low for at least one clock cycle, irrespective of any continuing presence of a low on the −REQUEST line 11 from some other bus master. As mentioned previously, this initialises all counters 20. However, if the signal on the −REQUEST line 11 is low, the arbitrator 10 then resets the +GRANT signal high with the next clock pulse to let the bus masters use the resource according to priority. If, on the other hand, no other bus master is requesting the resource (−REQUEST signal high), the +GRANT signal remains low.

A typical example of the operation of the arbitration system described above will now be described with reference to the timing diagrams of FIGS. 4 and 5. These figures illustrate the case where two bus masters, referred to as bus masters 1 and 2 respectively, and having priorities (initial counter values) of 14 and 13 respectively, compete for the same data bus. It will be recognised that these figures are essentially the same, the difference being that in FIG. 5 the component parts of the −REQUEST and −ACCEPT signals which appear in FIG. 4 have been artificially separated to show from which bus master they originate. Accordingly, a common explanation will suffice for both figures. It will be understood that, in FIG. 5, −REQUEST1, −ACCEPT1 and COUNT1 refer to bus master 1 whereas −REQUEST2, −ACCEPT2 and COUNT2 refer to bus master 2, the term COUNT referring to the current count value in the relevant bus master counter 20. The parallel vertical bars in the −REQUEST signals means that the transition can be asynchronous with respect to the clock 17.

The sequence of events is as follows, the numbering of the following paragraphs corresponding to the similarly numbered points on the timing diagrams.

1. Bus master 2 requests the resource.
2. Bus master 1 requests the resource.
3. Arbitrator 10 grants the resource an arbitrary time later depending upon its own use of the resource. At this point both counters 20, which had previously been held at their initial values, begin to count up.

4. Bus master 1 reaches count 15 before bus master 2 and accepts the resource, thereby pre-empting bus master 2. All counting is stopped by the −ACCEPT1 signal.
5. Bus master 1 releases the request.
6. Bus master 1 releases the resource; this occurs later due to delay in flip flops 22 and 23.
7. Arbitrator 10 removes the grant to reset the bus master counters.
8. Arbitrator 10 grants the resource since -REQUEST2 is low.
9. Bus master 2 reaches count 15 and accepts the resource.
10. Bus master 2 releases the request.
11. Bus master 2 releases the resource.
12. Arbitrator 10 removes the grant to withdraw the resource.

I claim:

1. In a digital data processing system having a resource which is shared between a plurality of users, an arbitration system comprising a plurality of resource requestors each associated with a respective user, and a resource grantor to which the requestors are connected in parallel via a set of common lines, each resource requestor being adapted to apply a request signal on a predetermined first one of the lines when the associated user requests the resource, and the resource grantor being responsive to the presence of a request signal on the first line to subsequently apply a grant signal on a predeterimined second one of the lines to grant the resource, each resource requestor requesting the resource being responsive the receipt of the grant signal to apply an accept signal on a predetermined third one of the lines after a delay from receipt which is different for each resource requestor and which determines the priority of the user associated with the resource requestor, a first accept signal so applied giving the resource to the associated user and preventing any other resource requestor from applying an accept signal on the third line until the resource is relinquished by the current user.

2. An arbitration system according to claim 1, wherein the grant signal is removed from the second line when the existing user relinquishes the resource irrespective of the presence of a request signal on the first line, and is reapplied to the second line only in the event of a request signal from a further resource requestor being present on the first line, removal of the grant signal serving to initialize all resource requestors such that none can apply an accept signal to the third line until after the full delay applicable to each.

3. An arbitration sysem according to claim 2, wherein the prority-determining delay in each resource requestor is determined by a counter which is adapted to provide an output signal, from which the accept signal is derived, after counting a respective predetermined number of clock signals which are applied continuously and in common to all the resource requestors, each counter being initialized by removal of the grant signal from the second line and being enabled to count when the grant signal is reapplied.

* * * * *